US012036671B2

(12) United States Patent
Son et al.

(10) Patent No.: US 12,036,671 B2
(45) Date of Patent: Jul. 16, 2024

(54) ACTUATOR MODULE WITH TORQUE OUTPUT CONTROL

(71) Applicant: ZEUS CO., LTD., Hwaseong-si (KR)

(72) Inventors: Jeong Won Son, Osan-si (KR); Yoo Jai Won, Busan (KR)

(73) Assignee: ZEUS CO., LTD., Hwaseong-si (KR)

( * ) Notice: Subject to any disclaimer, the term of this patent is extended or adjusted under 35 U.S.C. 154(b) by 42 days.

(21) Appl. No.: 17/525,058

(22) Filed: Nov. 12, 2021

(65) Prior Publication Data

US 2022/0161420 A1 May 26, 2022

(30) Foreign Application Priority Data

Nov. 20, 2020 (KR) ........................ 10-2020-0156907

(51) Int. Cl.
| | | |
|---|---|---|
| *B25J 9/12* | (2006.01) | |
| *B25J 17/02* | (2006.01) | |
| *B25J 19/00* | (2006.01) | |
| *F16D 55/28* | (2006.01) | |
| *H02K 9/02* | (2006.01) | |
| *H02K 9/10* | (2006.01) | |
| *H02K 11/225* | (2016.01) | |

(52) U.S. Cl.
CPC ........... *B25J 9/126* (2013.01); *B25J 17/0241* (2013.01); *B25J 19/0004* (2013.01); *F16D 55/28* (2013.01);
(Continued)

(58) Field of Classification Search
CPC ........ F16D 55/28; H02K 9/02; H02K 11/225; H02K 9/10; H02K 5/04; H02K 5/10;
(Continued)

(56) References Cited

U.S. PATENT DOCUMENTS

2018/0200896 A1* 7/2018 Boyland ................. H02K 7/102
2019/0363608 A1* 11/2019 Haun ....................... F16D 1/06

FOREIGN PATENT DOCUMENTS

| CN | 107398924 | 11/2017 |
| EP | 3 348 362 | 7/2018 |

(Continued)

OTHER PUBLICATIONS

KR20170092053A English translation (Year: 2023).*
(Continued)

*Primary Examiner* — Christopher M Koehler
*Assistant Examiner* — Viswanathan Subramanian
(74) *Attorney, Agent, or Firm* — KILE PARK REED & HOUTTEMAN PLLC

(57) ABSTRACT

An actuator module is provided. The actuator module includes a motor part including a drive shaft and a drive part configured to rotate the drive shaft, a reducer installed on one side of the drive part and configured to increase an output torque according to driving of the motor part, a brake installed on an opposite side of the drive part and configured to suppress rotation of the motor part, an encoder installed on one side of the brake and configured to sense an operation of the drive shaft, a controller installed on one side of the encoder and electrically connected to the motor part to control the motor part, and a first housing configured to surround the motor part, the reducer, the brake, the encoder and the controller. An airflow path through which an airflow can flow is formed to extend from the motor part.

14 Claims, 5 Drawing Sheets

(52) U.S. Cl.
CPC ............... *H02K 9/02* (2013.01); *H02K 9/10* (2013.01); *H02K 11/225* (2016.01)

(58) Field of Classification Search
CPC ........ H02K 5/18; H02K 7/1025; H02K 7/116; H02K 9/08; H02K 9/227; H02K 11/21; H02K 11/33; H02K 7/10; H02K 7/106; H02K 9/06; B25J 9/126; B25J 19/0004; B25J 17/0241
See application file for complete search history.

(56) References Cited

FOREIGN PATENT DOCUMENTS

| | | | | |
|---|---|---|---|---|
| JP | 2009-71919 A | | 4/2009 | |
| JP | 2017-94453 A | | 6/2017 | |
| KR | 10-2017-0092053 A | | 8/2017 | |
| KR | 20170092053 A | * | 8/2017 | |
| KR | 10-2177405 | | 11/2020 | |
| WO | WO-2020031482 A1 | * | 2/2020 | ............... B25J 9/06 |

OTHER PUBLICATIONS

WO2020031482A1 English translation (Year: 2023).*
Korean Office Action dated Jul. 12, 2022, corresponding to Korean Application No. 10-2020-0156907.
Extended European search report for European Patent Application or Patent No. 21207852.1 dated Apr. 29, 2022.

* cited by examiner

ACTUATOR MODULE WITH TORQUE OUTPUT CONTROL

CROSS-REFERENCE TO RELATED APPLICATION

This application is based upon and claims the benefit of priority from Korean Patent Application No. 10-2020-0156907, filed on Nov. 20, 2020, the entire contents of which are incorporated herein by reference.

TECHNICAL FIELD

The present disclosure relates to an actuator module including a heat dissipation structure.

The present disclosure has been derived from research conducted as part of the Core Technology Development For Energy Demand Management project of the Ministry of Trade, Industry and Energy of Republic of Korea. [Project Identification Number: 1415169323, Research Title: Development and Demonstration of Robot-Based Rapid Automatic Charging System For Electric Automobile]

BACKGROUND

An actuator module may have a sealed structure formed by a housing. Components of the actuator module may be located in the sealed structure formed by the housing. The actuator module can protect the components of the actuator module from external impact through the sealed structure of the housing and can prevent foreign substances from entering the components.

When the actuator module is driven, heat may be generated from some components of the actuator module. For example, heat may be generated from a motor and a controller among the components of the actuator module. The heat generated from the components of the actuator module located inside the housing needs to be dissipated out of the housing.

The actuator module may be mounted to a predetermined device to provide a driving force for driving the device. The actuator module may have a sealed structure that protects its components from external impact and prevents the inflow of foreign substances. When the actuator module is driven, heat may be generated from the components of the actuator module. Due to the sealed structure, the heat generated from the components of the actuator module is not dissipated to the outside and remains inside the housing. This may reduce the efficiency of dissipating the heat out of the housing.

If the heat generated from the components of the actuator module is not smoothly dissipated to the outside of the housing, some of the components of the actuator module may be damaged or malfunction due to high temperature, thereby causing problems in the operations of the components. For example, if an electronic circuit board or the like is damaged due to the heat, it may be difficult to operate the actuator module normally. A separate cooling line may be proposed in order to dissipate the heat generated from the components of the actuator module to the outside of the housing. However, such a cooling line increases the size of the actuator module, which may cause difficulties in miniaturization of the actuator module. In addition, such a cooling line is required to separately manage a refrigerant, which may cause difficulties in managing the actuator module by a user.

SUMMARY

Various embodiments of the present disclosure provide an actuator module including a heat dissipation structure.

Embodiments of the present disclosure solve the aforementioned problems and provide an actuator module that not only can have a sealed structure for protecting the components inside the actuator module but also can effectively dissipate heat generated inside the actuator module to the outside.

One aspect of the present disclosure provides embodiments of an actuator module.

An actuator module according to one embodiment includes a motor part including a drive shaft and a drive part configured to rotate the drive shaft, a reducer installed on one side of the drive part and configured to increase an output torque according to driving of the motor part, a brake installed on an opposite side of the drive part and configured to suppress rotation of the motor part, an encoder installed on one side of the brake and configured to sense an operation of the drive shaft, a controller installed on one side of the encoder and electrically connected to the motor part to control the motor part, and a first housing configured to surround the motor part, the reducer, the brake, the encoder and the controller. An airflow path through which an airflow can flow is formed to extend from the motor part.

In one embodiment, the actuator module may further include a heat dissipation structure installed on one side of the controller and configured to dissipate heat generated from the motor part. The airflow path may be formed to extend up to the heat dissipation structure.

In one embodiment, the actuator module may further include a second housing configured to surround at least a portion of the first housing and coupled to one side of the first housing. The second housing may form a sealed structure together with the first housing.

In one embodiment, a flexible sealing member may be disposed between the first housing and the second housing.

In one embodiment, the heat dissipation structure includes a heat dissipation plate made of a metal material.

In one embodiment, a gap may be formed between the controller and the heat dissipation structure, and the heat dissipation structure may be attached to an inner surface of the first housing.

In one embodiment, one end of the airflow path may be opened toward the motor part, and an opposite end of the airflow path may be opened toward the heat dissipation structure.

In one embodiment, the actuator module may further include a partition wall configured to hold the encoder and disposed between the brake and the encoder. The opposite end of the airflow path may penetrate through the partition wall and may be opened toward the heat dissipation structure.

In one embodiment, the airflow path may include, as a boundary surface thereof, an inner surface of the first housing and at least a portion of outer surfaces of the motor part, the brake and the partition wall.

In one embodiment, the airflow heated by the motor part may flow into the airflow path through the one end of the airflow path and may flow out from the airflow path through the opposite end of the airflow path.

In one embodiment, an airflow circulation member configured to circulate an airflow located around the motor part may be formed in the drive shaft.

In one embodiment, the airflow circulation member may be formed to protrude from the drive shaft in a radially outward direction when the drive shaft is rotated.

In one embodiment, the airflow circulation member may be rotated together with the drive shaft.

In one embodiment, the airflow circulation member may be a plurality of fans, and the plurality of fans may be disposed at an equal interval along a circumference of the drive shaft.

In one embodiment, the airflow circulation member may extend such that at least a portion of the airflow circulation member is located within the airflow path.

According to the embodiments of the present disclosure, the actuator module can have the sealed structure formed by the housing, thereby protecting the components inside the actuator module from external impact and preventing inflow of foreign substances.

According to the embodiments of the present disclosure, the actuator module not only can have the sealed structure, but also can effectively dissipate the heat generated inside the actuator module to the outside.

Further, according to the embodiments of the present disclosure, the heated airflow can be smoothly circulated in the actuator module, thereby dispersing the heat inside the housing of the actuator module. Therefore, it is possible to prevent the components of the actuator module from being damaged or from malfunctioning.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
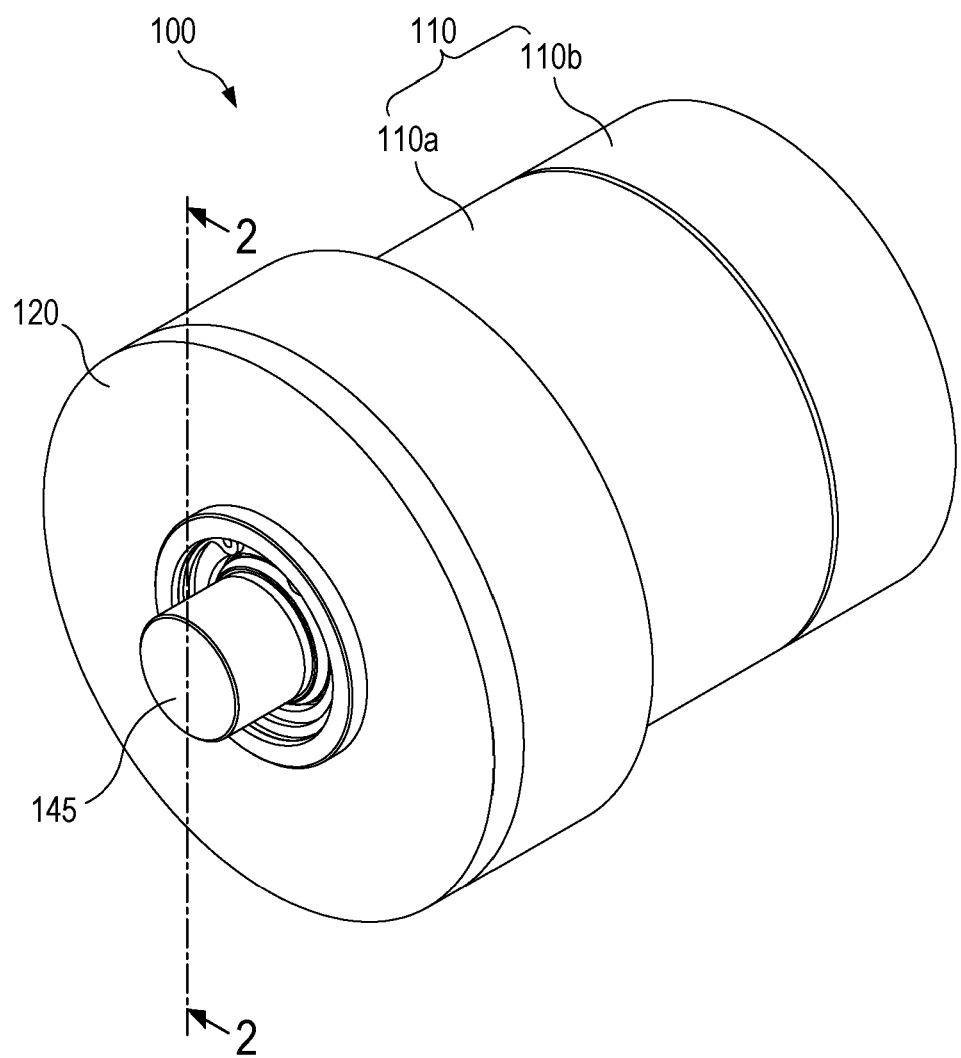
FIG. 1 is a perspective view of an actuator module according to one embodiment.

Embodiments of the present disclosure are illustrated for the purpose of explaining the technical idea of the present disclosure. The scope of rights according to the present disclosure is not limited to the embodiments presented below or the detailed descriptions of such embodiments.

An "embodiment" in the present disclosure is any classification for easily explaining the technical idea of the present disclosure, and individual embodiments do not need to be mutually exclusive to one another. For example, components disclosed in one embodiment may be applied to and embodied in another embodiment. The components disclosed in one embodiment may be applied and embodied by being modified without departing from the range of the present disclosure.

All technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

Expressions such as "comprising," "including," "having," and the like used in the present disclosure are to be understood as open-ended terms having the possibility of encompassing other embodiments, unless otherwise mentioned in the phrase or sentence containing such expressions. Further, the terms such as "part," "module," and the like used in the present disclosure mean a unit performing at least one function or operation.

A "longitudinal direction" of an element throughout the specification may be a direction in which the element extends along one directional axis of the element. In this regard, the one directional axis of the element may mean a direction in which the element extends longer than the other directional axis transverse to the one directional axis.

Expressions such as "consisting of only an element" and the like used in the present disclosure are to be understood as closed-ended terms excluding the possibility of encompassing another element other than said element.

Singular expressions described in the present disclosure may encompass plural expressions unless otherwise mentioned, which will also be applied to singular expressions recited in the claims.

Expressions such as "first," "second," etc. used in the present disclosure are used to separate a plurality of elements from each other, and are not intended to limit an order or importance of the elements.

The directional terms "one side" used in the present disclosure means any one direction with reference to a center of one element, while the directional terms "opposite side" means a direction opposite to the one side direction. However, this is merely a reference for purposes of explanation for clear understanding of the present disclosure. The one side and the opposite side may be defined differently depending on where the reference is set.

Hereinafter, embodiments of the present disclosure will be described with reference to the accompanying drawings. Like reference numerals in the drawings denote like or corresponding elements. Further, in the following descriptions of the embodiments, redundant descriptions for the same or corresponding elements may be omitted. However, even if the descriptions of the elements are omitted, such elements are not intended to be excluded in any embodiment.

FIG. 1 is a perspective view of an actuator module according to one embodiment.

The actuator module 100 may include a first housing 110 and a second housing 120 which form the exterior of the actuator module 100. The first housing 110 and the second housing 120 may be separated from each other. The second housing 120 may be coupled to one side of the first housing. The first housing 110 and the second housing 120 may be coupled to each other to form a sealed structure therein.

The first housing 110 may be divided into one end portion 110*a* and an opposite end portion 110*b*. The one end portion 110*a* and the opposite end portion 110*b* of the first housing 110 may be coupled to each other to form an internal space. Components of the actuator module 100 may be disposed in the internal space.

A connection member 145 may protrude toward one side of the second housing 120. The connection member 145 may be connected to a predetermined device. The connection member 145 connected to the predetermined device may provide the predetermined device with a driving force for driving the device.

Figure 2:
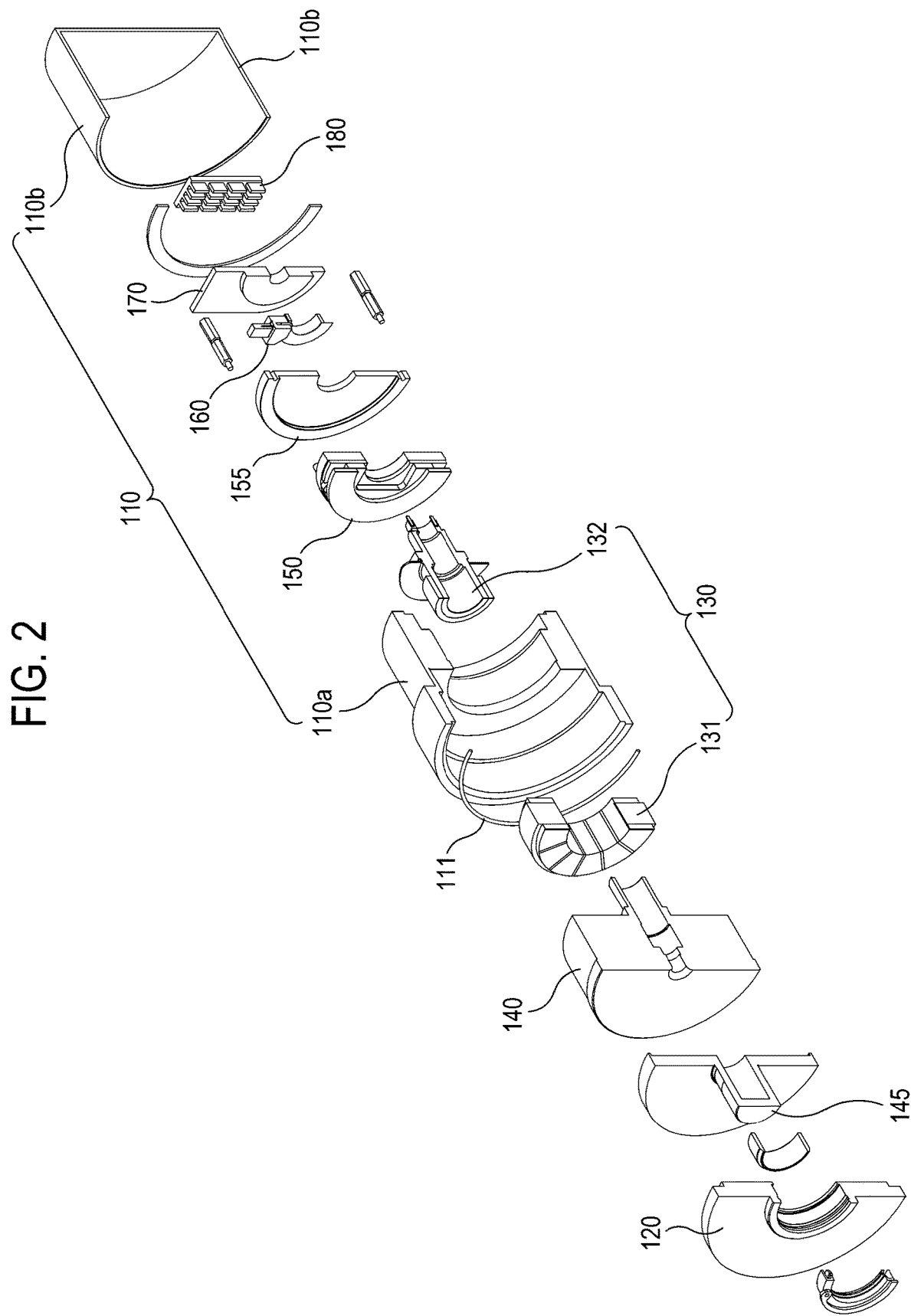
FIG. 2 is an exploded cross-sectional perspective view of the actuator module shown in FIG. 1, which is taken along line 2-2 in FIG. 1.

FIG. 2 is an exploded cross-sectional perspective view of the actuator module shown in FIG. 1, which is taken along line 2-2 in FIG. 1.

The internal components of the actuator module 100 will be described with reference to FIG. 2. The actuator module 100 may include a motor part 130 installed in the first housing 110. The motor part 130 may include a drive shaft 132 and a drive part 131 configured to rotate the drive shaft 132.

The drive part 131 may convert electrical energy into rotational energy by using a force applied to a conductor in a magnetic field. The drive part 131 may include a stator. The stator may include a plurality of stator cores. The drive part 131 may include coils that are wound around the stator cores so as to form a rotating magnetic field. When an electric current flows through the coils, the drive part 131 may rotate the drive shaft 132 through electrical interaction.

The drive shaft 132 may be held in the drive part 131. The drive shaft 132 may be held in the drive part 131 through a bearing. When an electrical current flows through the drive part 131, the drive part 131 may generate an electromagnetic field that gives an electromagnetic influence to the drive shaft 132. The drive shaft 132 held in the drive part 131 may be rotated through electrical interaction with the drive part 131. The drive shaft 132 may rotate the connection member 145 protruding toward one side of the second housing 120. The drive shaft 132 may extend from one side to the opposite side in an elongated shape. The drive shaft 132 may be a member that transmits the rotational energy of the motor part 130. The drive shaft 132 may transmit the output of the motor part 130.

The actuator module 100 may include a reducer 140 installed on one side of the drive part 131. The reducer 140 may increase the output of the motor part 130. The reducer 140 may increase torque according to the output of the motor part 130. The reducer 140 may be, for example, at least one of a gear-type reducer, a rolling ball-type reducer, a harmonic drive reducer and a cycloidal reducer.

The gear-type reducer is a widely used reducer, and may use an involute tooth form. The rolling ball-type reducer may be a reducer which performs speed reduction rotation by balls rolling along a guide groove having a shape in which an epicycloid curve and a hypocycloid curve face each other. The harmonic drive reducer may be a reducer which induces speed reduction by transmitting only an elliptical motion component to a flexspline due to an elliptically turning bearing when an elliptical wave generator assembly rotates, and slowly rotating the flexspline such that the flexspline skips an outermost ring gear by one tooth at a time. The cycloidal reducer may be a reducer which achieves speed reduction rotation by fixing pins, and eccentrically rotating a trochoid gear as a planetary gear, and then causing the trochoid gear to only rotate through the pins and the pin holes arranged in the trochoid gear at the same angle.

The actuator module 100 may include a brake 150 installed on the opposite side of the drive part 131. The brake 150 may be connected to the drive shaft 132. The brake 150 may suppress rotation of the motor part 130 when an electric power source is not connected to the motor part 130. That is, when an electric power source is not connected to the motor part 130, the brake 150 may prevent the rotation of the motor part 130 to hinder the motor part 130 from being driven.

The actuator module 100 may include an encoder 160 installed on one side of the brake 150. The encoder 160 may sense the operation of the motor part 130. The encoder 160 may measure a rotation angle of the drive shaft 132 of the motor part 130. The encoder 160 may detect the rotation of the drive shaft 132 by measuring the angle of the drive shaft 132. The encoder 160 may output an electrical signal when the drive shaft 132 is rotated. The encoder 160 may be, for example, a potentiometer or an optical rotary encoder, but the type of the encoder 160 is not limited thereto.

The actuator module 100 may include a controller 170 installed on one side of the encoder 160. The controller 170 may be electrically connected to the motor part 130 to control the motor part 130. The controller 170 may include a motor driver. The controller 170 may receive a user's signal to control the output of the motor part 130. For example, the controller 170 may increase the output of the motor part 130 or reduce the output of the motor part 130 according to the user's signal. As the output of the motor part 130 is increased or reduced according to the user's signal, the output of the actuator module 100, i.e., the driving force of the actuator module 100, may be controlled, and the movement of the predetermined device connected to the actuator module 100 may be controlled.

The actuator module 100 may include a partition wall 155 configured to hold the encoder 160. The encoder 160 may be mounted on the partition wall 155. The partition wall 155 may be located between the brake 150 and the encoder 160. The partition wall 155 may be connected to the first housing 110. The partition wall 155 may be connected to the first housing 110 to partition one side of the partition wall 155 and the opposite side of the partition wall 155. For example, the motor part 130, the reducer 140 and the brake 150 may be disposed on one side of the partition wall 155, and the encoder 160, the controller 170 and a heat dissipation structure 180 may be disposed on the opposite side of the partition wall 155.

The actuator module 100 may include the heat dissipation structure 180 installed on one side of the controller 170. The heat dissipation structure 180 may be installed on one side of the controller 170 so as to be spaced apart from the controller 170 by a predetermined distance. The heat dissipation structure 180 may be installed on the inner surface of the first housing 110 so as to be spaced apart from the controller 170 by a predetermined distance. The heat dissipation structure 180 may be fixed to the inner surface of the opposite end portion 110b of the first housing 110.

The heat dissipation structure 180 may absorb heat of the inside of the first housing 110 and may transfer the heat to the outside of the first housing 110. The heat dissipation structure 180 may be made of a metal material. The metal material may include, but is not limited to, copper (Cu), aluminum (Al) and the like having excellent thermal conductivity. The heat dissipation structure 180 may include a plurality of heat dissipation plates made of a metal material. The heat dissipation plates may protrude in a direction from the inner surface of the opposite end portion 110b of the first housing 110 toward the motor part 130.

A sealing member 111 may be disposed between the one end portion 110a of the first housing 110 and the second housing 120. The sealing member 111 may be flexible. The sealing member 111 may be, for example, rubber, but the material of the sealing member 111 is not limited thereto.

The sealing member 111 may extend along a contact portion between the one end portion 110a of the first housing 110 and the second housing 120. For example, when the contact portion between the one end portion 110a of the first housing 110 and the second housing 120 has a circular shape, the sealing member 111 may also extend in a circular shape. The one end portion 110a of the first housing 110 and the second housing 120 may be airtightly coupled to each other through the sealing member 111. A sealed structure may be formed by the first housing 110 and the second housing 120.

Figure 3:
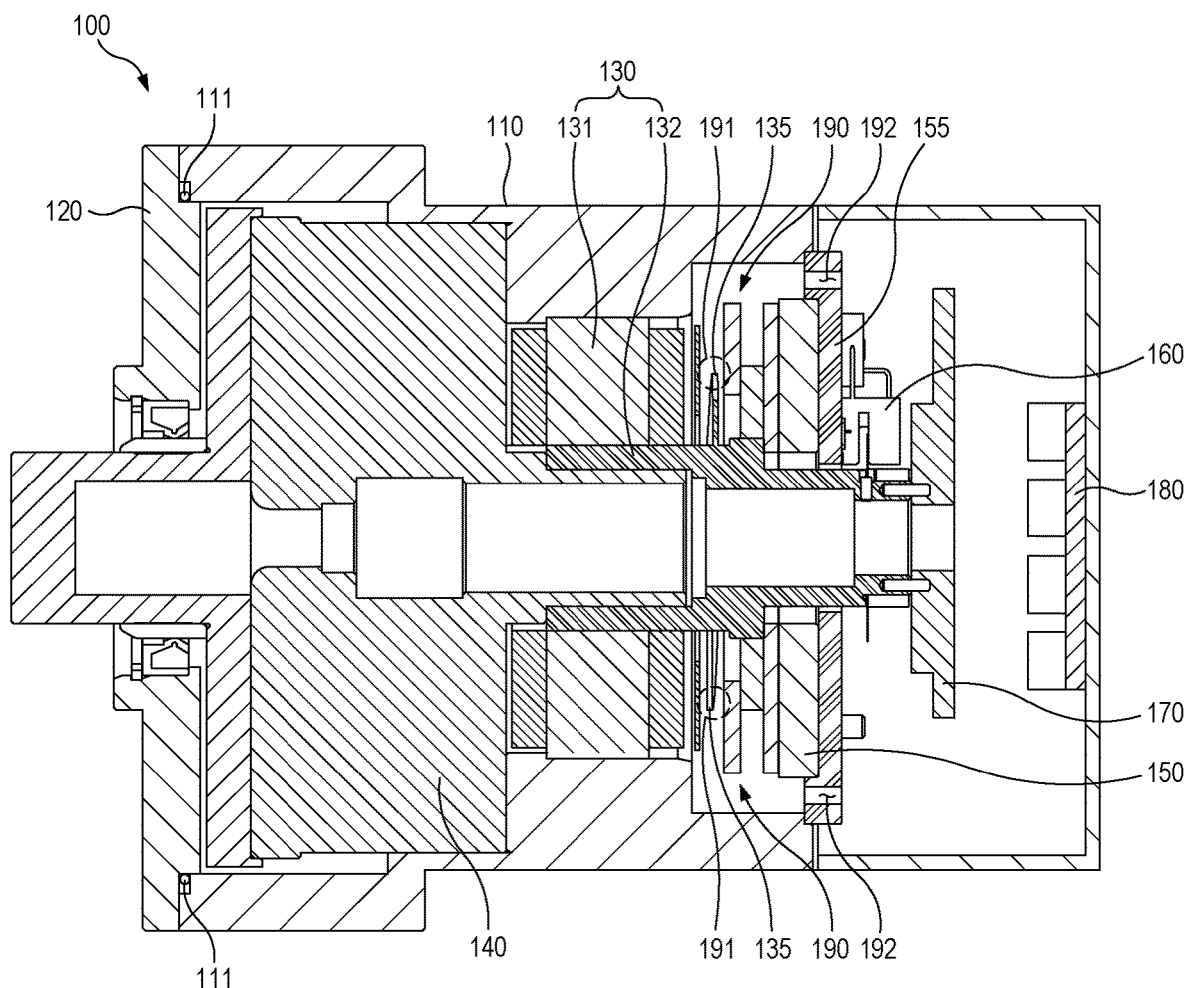
FIG. 3 is a cross-sectional view of the actuator module shown in FIG. 1, which is taken along the line 2-2 in FIG. 1.

FIG. 3 is a cross-sectional view of the actuator module shown in FIG. 1, which is taken along the line 2-2 in FIG. 1.

FIG. 3 shows the components of the actuator module 100 that are disposed in a direction transverse to the line 2-2 in the actuator module 100.

The first housing 110 and the second housing 120 of the actuator module 100 may be coupled to each other to form the sealed structure therein. The first housing 110 may surround the motor part 130, the reducer 140, the brake 150, the encoder 160, the controller 170, and the heat dissipation structure 180. The components of the actuator module 100 may be disposed inside the sealed structure. The actuator module 100 may include the motor part 130 that includes the drive shaft 132 and the drive part 131 for rotating the drive shaft 132. The reducer 140 for increasing the torque according to the output of the motor part 130 may be disposed on one side of the drive part 131. The brake 150 for suppressing the rotation of the drive shaft 132 may be disposed on the opposite side of the drive part 131. The encoder 160 for sensing the operation of the drive shaft 132 may be disposed on one side of the brake 150. The partition wall 155 may be disposed between the brake 150 and the encoder 160. The controller 170 electrically connected to the motor part 130 to control the motor part 130 may be disposed on one side of the encoder 160. The heat dissipation structure 180 may be disposed on one side of the controller 170. The heat dissipation structure 180 may be disposed so as to be spaced apart from the controller 170 by a predetermined distance.

In the actuator module 100 according to an embodiment, an airflow path 190 through which an airflow can flow may be formed to extend from the motor part 130 up to the heat dissipation structure 180. The airflow path 190 may be a path through which the airflow heated in the motor part 130 flows to the heat dissipation structure 180.

Figure 4:
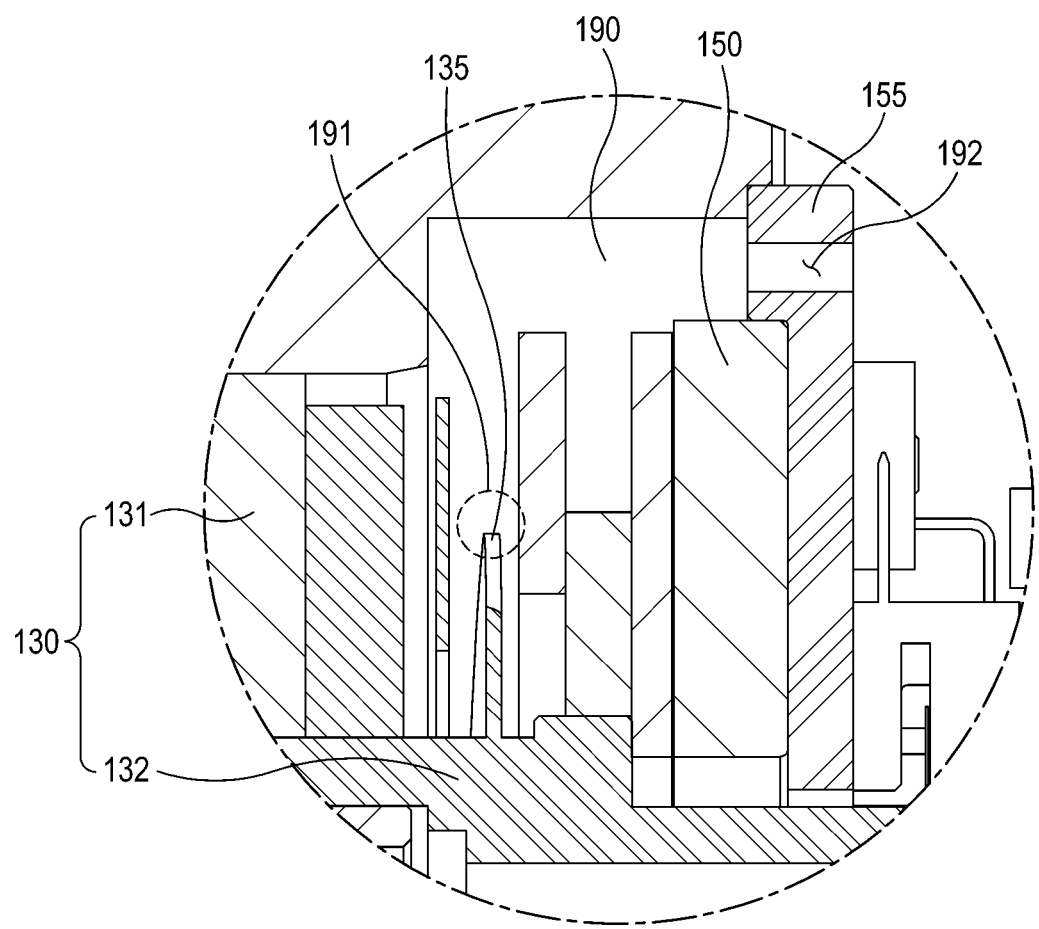
FIG. 4 is an enlarged partial cross-sectional view showing an airflow path shown in FIG. 3.

FIG. 4 is an enlarged partial cross-sectional view showing the airflow path shown in FIG. 3.

The airflow path 190 may include one end 191 and the opposite end 192. The one end 191 of the airflow path 190 may be opened toward the motor part 130, and the opposite end 192 of the airflow path 190 may be opened toward the heat dissipation structure 180.

The opposite end 192 of the airflow path 190 may penetrate through the partition wall 155 disposed between the brake 150 and the encoder 160. That is, a through-hole may be formed in the partition wall 155, and the opposite end 192 of the airflow path 190 may include the through-hole of the partition wall 155. As the opposite end 192 of the airflow path 190 penetrates through the partition wall 155, the airflow flowing along the airflow path 190 may flow from the motor part 130 toward the heat dissipation structure 180 without being blocked by the partition wall 155.

The airflow path 190 may include, as a boundary surface, the inner surface of the first housing 110 and at least a portion of the outer surfaces of the motor part 130, the brake 150, and the partition wall 155. That is, a predetermined boundary surface of the airflow path 190 may be the inner surface of the first housing 110 and at least a portion of the outer surfaces of the motor part 130, the brake 150, and the partition wall 155. The airflow path 190 may be a portion surrounded by the inner surface of the first housing 110 and at least a portion of the outer surfaces of the motor part 130, the brake 150 and the partition wall 155.

The airflow heated by the heat generated in the motor part 130 may be circulated while passing through the airflow path 190. The heated airflow may flow into the airflow path 190 through the one end 191 of the airflow path 190. The airflow flowing into the airflow path 190 may pass through the airflow path 190 which includes, as the boundary surface, the inner surface of the first housing 110 and at least a portion of the outer surfaces of the motor part 130, the brake 150 and the partition wall 155. The airflow may flow out from the airflow path 190 through the opposite end 192 of the airflow path 190. Here, the opposite end 192 may include the through-hole formed in the partition wall 155. The airflow flowing out from the airflow path 190 may reach the heat dissipation structure 180 and thereafter may be rapidly cooled.

An airflow circulation member 135 configured to circulate the airflow located around the motor part 130 may be formed in the drive shaft 132 of the actuator module 100 according to an embodiment. The airflow circulation member 135 may circulate the airflow located around the drive shaft 132. The airflow circulation member 135 may circulate the heated airflow located around the drive shaft 132 to prevent the heated airflow from remaining around the drive shaft 132 for more than a certain period of time.

The airflow circulation member 135 may be formed to protrude from the drive shaft 132 in a radially outward direction. At least a portion of the airflow circulation member 135 may extend so as to be located within the airflow path 190. At least a portion of the airflow circulation member 135 may be located at the one end 191 of the airflow path 190. The airflow circulation member 135 may be rotated together with the drive shaft 132 when the drive shaft 132 is rotated. The airflow circulation member 135 may circulate the airflow while being rotated together with the drive shaft 132 according to the rotation of the drive shaft 132. At least a portion of the airflow circulation member 135 may allow the heated airflow to pass through the airflow path 190 while being rotated in the airflow path 190.

Figure 5:
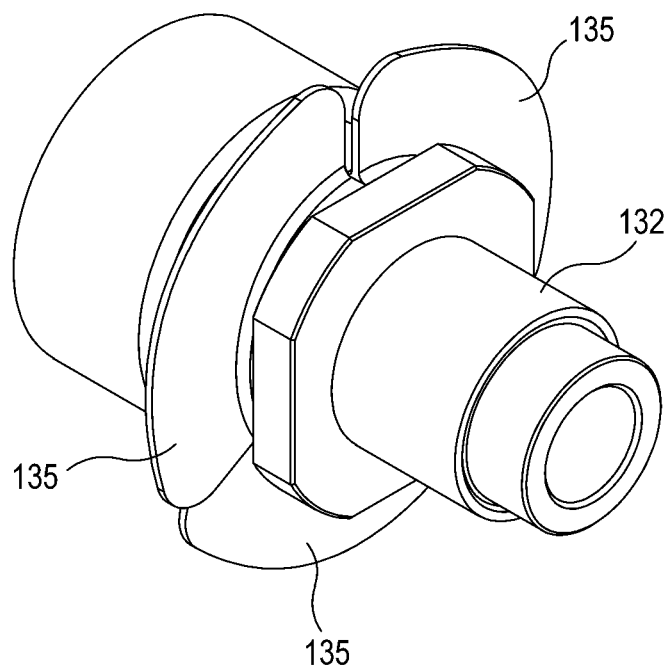
FIG. 5 is an exemplary perspective view of an airflow circulation member shown in FIG. 3.

FIG. 5 is an exemplary perspective view of the airflow circulation member shown in FIG. 3.

Referring to FIG. 5, the airflow circulation member 135 may be a plurality of fans. The plurality of fans may be disposed at an equal interval along the circumference of the drive shaft 132. The plurality of fans may extend in a radially outward direction from a rotation axis about which the drive shaft 132 is rotated. The plurality of fans may have a width that gradually increases along the radially outward direction from the rotation axis of the drive shaft 132.

The plurality of fans may cause the airflow to flow in a direction away from the drive shaft 132. The plurality of fans may lower the ambient temperature by causing the ambient airflow to flow. The number and shape of the plurality of fans are not limited to those shown in FIG. 5, and may be varied as necessary.

Figure 6:
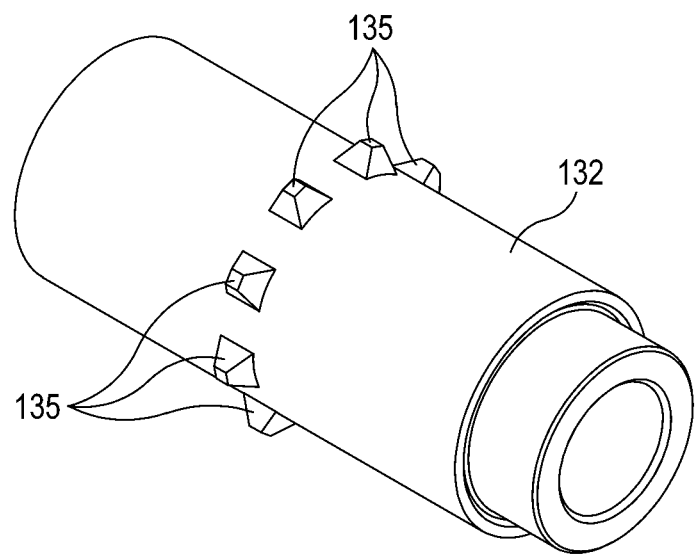
FIG. 6 is another exemplary perspective view of an airflow circulation member shown in FIG. 3.

FIG. 6 is another exemplary perspective view of the airflow circulation member shown in FIG. 3.

Referring to FIG. 6, the airflow circulation member 135 may be a plurality of protrusions. The plurality of protrusions may have the same shape, and may be disposed at an equal interval along the circumference of the drive shaft 132. The plurality of protrusions may generate wind in a direction away from the drive shaft 132 when the drive shaft 132 is rotated. Each of the protrusions may have a width that gradually decreases in a direction away from the drive shaft 132. Each of the protrusions may be, for example, a prism including a cylinder, or a truncated pyramid including a truncated cone. For example, when each of the protrusions is a truncated quadrangular pyramid, the protrusion may have a quadrangular cross-section, and the area of the quadrangular cross-section may gradually decrease along a direction away from the drive shaft 132.

The actuator module 100 according to one embodiment can have the sealed structure formed by the housing, thereby protecting the components inside the actuator module 100 from external impact and preventing the inflow of foreign substances. Further, the actuator module 100 according to one embodiment not only can have the sealed structure, but also can effectively dissipate the heat generated inside the actuator module 100 to the outside. The heated airflow can be smoothly circulated in the actuator module 100, thereby dispersing the heat inside the housing of the actuator module 100. Therefore, it is possible to prevent the components of the actuator module 100 from being damaged or from malfunctioning.

The technical idea of the present disclosure has been described heretofore with reference to some embodiments and examples shown in the accompanying drawings. However, it is to be understood that various substitutions, modifications and alterations may be made without departing from the technical idea and scope of the present disclosure that can be understood by those of ordinary skill in the technical field to which the present disclosure pertains. Further, it is to be understood that such substitutions, modifications and alterations fall within the scope of the appended claims.

What is claimed is:

1. An actuator module, comprising:
   a motor part including a drive shaft and a drive part configured to rotate the drive shaft;
   a reducer installed on one side of the drive part and configured to increase an output torque according to driving of the motor part;
   a brake installed on an opposite side of the drive part and configured to suppress rotation of the motor part;
   an encoder installed on one side of the brake and configured to sense an operation of the drive shaft;
   a controller installed on one side of the encoder and electrically connected to the motor part to control the motor part;
   a first housing configured to surround the motor part, the reducer, the brake, the encoder, and the controller, the first housing including one end portion of the first housing and an opposite end portion of the first housing that are coupled to each other to form an internal space;
   a partition wall configured to hold the encoder and disposed between the brake and the encoder; and
   a heat dissipation structure installed inside the internal space on one side of the controller, fixed to an inner surface of the opposite end portion of the first housing, and configured to dissipate heat generated from the motor part,
   wherein the partition wall is coupled to the first housing to partition one side of the partition wall and an opposite side of the partition wall and has a through-hole,
   wherein an airflow path through which an airflow can flow is formed to extend from the motor part through the through-hole of the partition wall up to the heat dissipation structure, and
   wherein the heat dissipation structure includes a plurality of heat dissipation plates protruding from the inner surface of the opposite end portion of first housing toward the motor part.

2. The actuator module of claim 1, further comprising a second housing configured to surround at least a portion of the first housing and coupled to one side of the first housing, wherein the second housing forms a sealed structure together with the first housing.

3. The actuator module of claim 2, wherein a flexible sealing member is disposed between the first housing and the second housing.

4. The actuator module of claim 1, wherein the plurality of heat dissipation plates are made of a metal material.

5. The actuator module of claim 4, wherein a gap is formed between the controller and the heat dissipation structure.

6. The actuator module of claim 1, wherein one end of the airflow path is opened toward the motor part, and an opposite end of the airflow path is opened toward the heat dissipation structure.

7. The actuator module of claim 6, wherein the opposite end of the airflow path penetrates through the partition wall and is opened toward the heat dissipation structure.

8. The actuator module of claim 7, wherein the airflow path includes, as a boundary surface thereof, an inner surface of the first housing and at least a portion of outer surfaces of the motor part, the brake, and the partition wall.

9. The actuator module of claim 6, wherein the airflow heated by the motor part flows into the airflow path through the one end of the airflow path and flows out from the airflow path through the opposite end of the airflow path.

10. The actuator module of claim 1, wherein an airflow circulation member configured to circulate an airflow located around the motor part is formed in the drive shaft.

11. The actuator module of claim 10, wherein the airflow circulation member is formed to protrude from the drive shaft in a radially outward direction.

12. The actuator module of claim 11, wherein the airflow circulation member is configured to be rotated together with the drive shaft when the drive shaft is rotated.

13. The actuator module of claim 11, wherein the airflow circulation member is a plurality of fans, and the plurality of fans are disposed at an equal interval along a circumference of the drive shaft.

14. The actuator module of claim 11, wherein the airflow circulation member extends such that at least a portion of the airflow circulation member is located within the airflow path.

* * * * *